US011079535B2

(12) United States Patent
Hawthorne et al.

(10) Patent No.: US 11,079,535 B2
(45) Date of Patent: Aug. 3, 2021

(54) LIGHTING FIXTURE

(71) Applicant: Hubbell Incorporated, Shelton, CT (US)

(72) Inventors: Sean M. Hawthorne, Boston, MA (US); Timothy S. Farrell, Simpsonville, SC (US); Michael F. Conroy, Attleboro, MA (US); Rachel L. Sidiropoulos, Middleboro, MA (US)

(73) Assignee: Hubbell Incorporated, Shelton, CT (US)

( * ) Notice: Subject to any disclaimer, the term of this patent is extended or adjusted under 35 U.S.C. 154(b) by 105 days.

(21) Appl. No.: 16/400,158

(22) Filed: May 1, 2019

(65) Prior Publication Data

US 2019/0339445 A1 Nov. 7, 2019

Related U.S. Application Data

(60) Provisional application No. 62/807,341, filed on Feb. 19, 2019, provisional application No. 62/665,181, filed on May 1, 2018.

(51) Int. Cl.
*F21V 8/00* (2006.01)
*F21S 8/02* (2006.01)
*F21Y 115/10* (2016.01)

(52) U.S. Cl.
CPC ............ *G02B 6/0091* (2013.01); *F21S 8/026* (2013.01); *G02B 6/0013* (2013.01); *G02B 6/0055* (2013.01); *G02B 6/0068* (2013.01); *G02B 6/0073* (2013.01); *F21Y 2115/10* (2016.08)

(58) Field of Classification Search
CPC .. G02B 6/0091; G02B 6/0013; G02B 6/0055; G02B 6/0068; G02B 6/0073; F21S 8/026
See application file for complete search history.

(56) References Cited

U.S. PATENT DOCUMENTS

| | | | |
|---|---|---|---|
| D320,283 S | 9/1991 | Burkarth | |
| D399,586 S | 10/1998 | Ranieri et al. | |
| D407,473 S | 3/1999 | Wimbock | |
| 6,161,939 A * | 12/2000 | Bansbach | F21S 8/061 362/223 |
| D477,891 S | 7/2003 | Fritze et al. | |
| D496,121 S | 9/2004 | Santoro | |
| D545,483 S | 6/2007 | Mayfield et al. | |
| D556,358 S | 11/2007 | Santoro | |

(Continued)

*Primary Examiner* — Mary Ellen Bowman
(74) *Attorney, Agent, or Firm* — Michael Best & Friedrich LLP

(57) ABSTRACT

A lighting fixture defines a lateral direction, a transverse direction, and a vertical direction. The light fixture includes a frame and a first panel supported by the frame. The first panel includes a first edge extending between a front surface of the first panel and a rear surface of the first panel. The lighting fixture includes a second panel supported by the frame. The second panel includes a second edge extending between a front surface of the second panel and a rear surface of the second panel. The lighting fixture includes at least one light source configured to illuminate the first panel and the second panel. The lighting fixture includes a light reflector extending adjacent to the rear surface of the first panel and the rear surface of the second panel. The light reflector reflects light emitted from at least one of the first panel and the second panel.

20 Claims, 19 Drawing Sheets

(56) References Cited

U.S. PATENT DOCUMENTS

| | | |
|---|---|---|
| D561,930 S | 2/2008 | Hukle et al. |
| D572,858 S | 7/2008 | Santoro |
| D595,006 S | 6/2009 | Santoro |
| D597,241 S | 7/2009 | Fabbri |
| D608,931 S | 1/2010 | Castelli |
| D614,792 S | 4/2010 | Fabbri |
| D665,119 S | 8/2012 | Bryant |
| D675,364 S | 1/2013 | Watt |
| D678,597 S | 3/2013 | Lehman |
| D701,988 S | 4/2014 | Clements |
| D726,362 S | 4/2015 | Kim |
| D730,556 S | 5/2015 | Toyohisa |
| D733,960 S | 7/2015 | Howe |
| D734,534 S | 7/2015 | Howe |
| D735,401 S | 7/2015 | Clements |
| 9,110,216 B2 | 8/2015 | Blessitt et al. |
| D739,977 S | 9/2015 | Boyer |
| D750,831 S | 3/2016 | Clements |
| 9,335,041 B2 | 5/2016 | Marquardt |
| D767,193 S | 9/2016 | Jung |
| D769,515 S | 10/2016 | Clark |
| D770,083 S | 10/2016 | Clark |
| D786,471 S | 5/2017 | Snell |
| D788,356 S | 5/2017 | Clements |
| 9,666,744 B2 * | 5/2017 | Clements .............. G02B 6/0075 |
| D807,557 S | 1/2018 | Stromborg |
| D810,998 S | 2/2018 | Difelice |
| D812,806 S | 3/2018 | Luo |
| D819,861 S | 6/2018 | Scribante |
| 10,012,354 B2 | 7/2018 | Bernard |
| 10,067,284 B1 * | 9/2018 | DiFelice .............. G02B 6/0068 |
| D830,604 S | 10/2018 | Watt |
| D833,663 S | 11/2018 | Stromborg |
| 10,240,760 B1 | 3/2019 | Lehman |
| 10,274,173 B2 * | 4/2019 | Schubert .............. F21V 17/164 |
| 10,400,992 B2 | 9/2019 | Kim |
| D862,787 S | 10/2019 | Rashidi |
| 2008/0232107 A1 | 9/2008 | Hsu |
| 2011/0029680 A1 | 12/2011 | Tsai |
| 2012/0140461 A1 | 6/2012 | Pickard |
| 2013/0294053 A1 | 11/2013 | Marquardt |
| 2014/0126195 A1 | 5/2014 | Dixon |
| 2015/0029709 A1 | 1/2015 | Lu et al. |
| 2015/0168636 A1 * | 6/2015 | Holman .............. G02B 6/0085 362/609 |
| 2015/0252982 A1 | 9/2015 | Demuynck |
| 2015/0378081 A1 | 12/2015 | Blessitt et al. |
| 2016/0377261 A1 | 12/2016 | Bernard |
| 2017/0263803 A1 | 9/2017 | Clements |
| 2018/0113244 A1 * | 4/2018 | Vasylyev .............. G02B 6/0061 |
| 2018/0341054 A1 * | 11/2018 | Blessitt .............. G02B 6/0073 |

* cited by examiner

LIGHTING FIXTURE

PRIORITY CLAIM

The present application is based on and claims priority to U.S. Provisional App. No. 62/665,181, titled "Lighting Fixture," having a filing date of May 1, 2018, which is incorporated by reference herein. The present application is also based on and claims priority to U.S. Provisional App. No. 62/807,341, titled "Lighting Fixture," having a filing date of Feb. 19, 2019, which is also incorporated by reference herein.

FIELD

The present disclosure relates generally to lighting fixtures.

BACKGROUND

Lighting fixtures (e.g., luminaires) using light emitting diodes (LEDs) have in recent years become somewhat practical and continue to penetrate the lighting market due to the increased luminous efficacy of commercially available LED components. LED lighting fixtures are desirable as they offer customers energy savings due to good luminous efficacy combined with the ability to precisely control light distribution patterns.

SUMMARY

Aspects and advantages of embodiments of the present disclosure will be set forth in part in the following description, or may be learned from the description, or may be learned through practice of the embodiments.

One example aspect of the present disclosure is directed to a lighting fixture that defines a lateral direction, a transverse direction, and a vertical direction. The light fixture includes a frame and a first panel supported by the frame. The first panel includes a first edge extending between a front surface of the first panel and a rear surface of the first panel. The lighting fixture includes a second panel supported by the frame. The second panel includes a second edge extending between a front surface of the second panel and a rear surface of the second panel. The lighting fixture includes at least one light source configured to illuminate the first panel and the second panel. The lighting fixture includes a light reflector extending adjacent to the rear surface of the first panel and the rear surface of the second panel. The light reflector reflects light emitted from at least one of the first panel and the second panel Another example aspect of the present disclosure is directed to a lighting fixture that defines a lateral direction, a transverse direction, and a vertical direction. The lighting fixture includes a frame and a first light guide supported by the frame. The first light guide can include a receiving edge and an emitting edge. The receiving edge and the emitting edge each extend between a front surface of the first light guide and a rear surface of the first light guide. The lighting fixture further includes a second light guide supported by the frame. The second light guide can include a receiving edge and an emitting edge. The receiving edge of the second light guide and the emitting edge of the second light guide can each extend between a front surface of the second light guide and a rear surface of the second light guide. The lighting fixture can further include a first light source positioned adjacent to the receiving edge of the first light guide to illuminate the first light guide. The lighting fixture can include a second light source positioned adjacent to the receiving edge of the second light guide to illuminate the second light guide. The lighting fixture can include a light reflector extending adjacent to the rear surface of the first light guide and the rear surface of the second light guide. The light reflector can be configured to reflect light emitted from the emitting edge of the first light guide and the emitting edge of the second light guide.

Yet another example aspect of the present disclosure is directed to a lighting fixture that defines a lateral direction, a transverse direction, and a vertical direction. The lighting fixture can include a frame and a first light guide supported by the frame. The first light guide can include a receiving edge and an emitting edge. The receiving edge and the emitting edge each extend between a front surface of the first light guide and a rear surface of the first light guide. The lighting fixture can further include a second light guide supported by the frame and spaced apart from the first light guide along the lateral opening to define an opening. The second light guide can include a receiving edge and an emitting edge. The receiving edge of the second light guide and the emitting edge of the second light guide can each extend between a front surface of the second light guide and a rear surface of the second light guide. The lighting fixture can include a first set of one or more LEDs positioned adjacent to the receiving edge of the first light guide to illuminate the first light guide. The lighting fixture can further include a second set of LEDs positioned adjacent to the receiving edge of the second light guide to illuminate the second light guide. The lighting fixture can include a light reflector extending adjacent to the rear surface of the first light guide and the rear surface of the second light guide. Furthermore, at least a portion of the light reflector can be positioned above the opening along the vertical direction and extend along the lateral direction between the first light guide and the second light guide.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
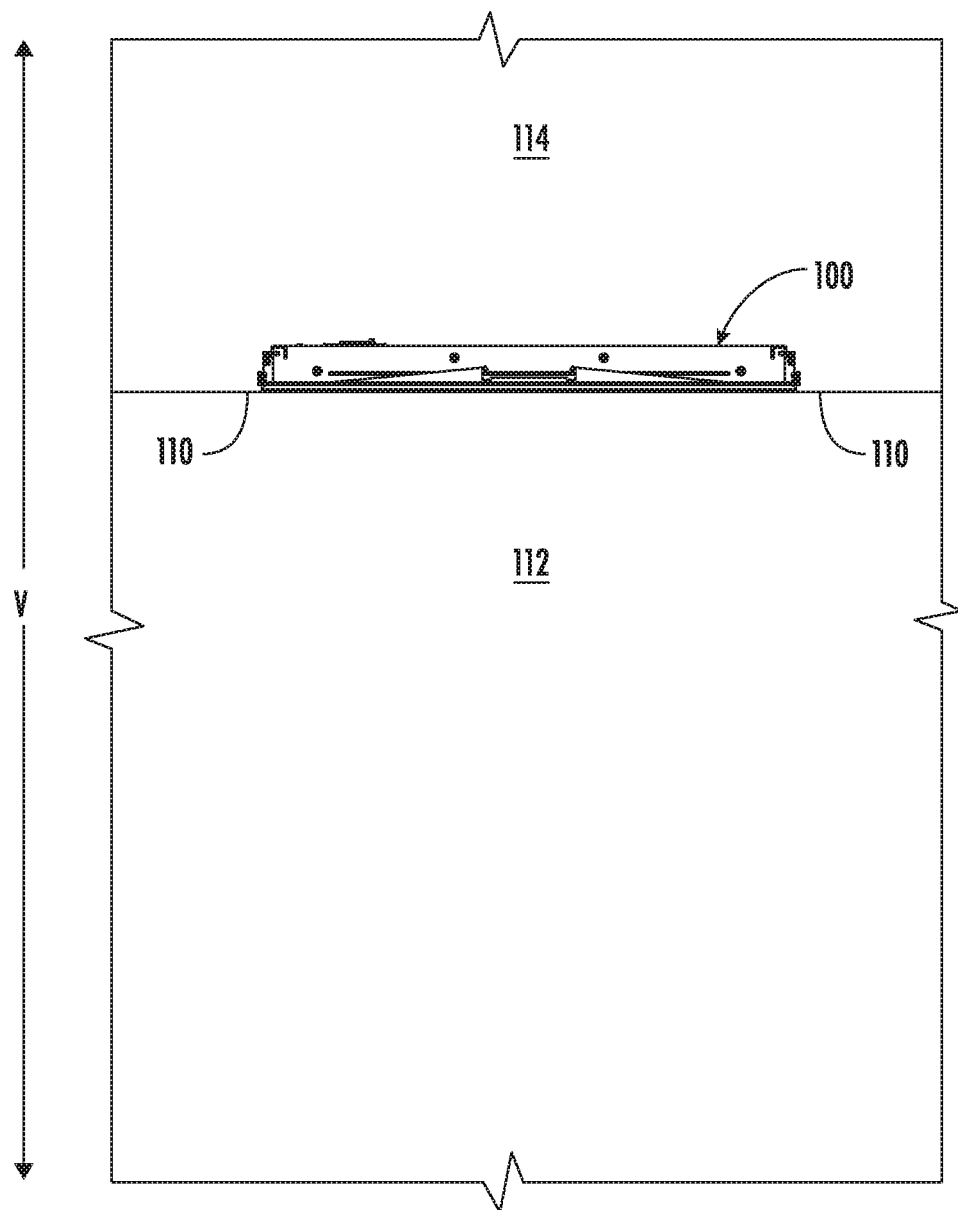
FIG. 1 depicts an environment having a lighting fixture according to example embodiments of the present disclosure.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to a lighting fixture that defines a lateral direction, a transverse direction, and a vertical direction. The light fixture can include a frame and a first panel supported by the frame. The first panel can include a first edge extending between a front surface of the first panel and a rear surface of the first panel. The lighting fixture can include a second panel supported by the frame. The second panel can include a second edge extending between a front surface of the second panel and a rear surface of the second panel. The lighting fixture can include at least one light source configured to illuminate the first panel and the second panel. The lighting fixture can further include a light reflector extending adjacent to the rear surface of the first panel and the rear surface of the second panel. The light reflector can be configured to reflect light emitted from at least one of the first panel and the second panel.

In some implementations, the lighting fixture can include a first set of one or more LEDs and a second set of one or more LEDs. The first set of LEDs can be positioned adjacent the first edge to illuminate the first panel. The second set of LEDs can be positioned adjacent the second edge to illuminate the second panel.

In some implementations, the light reflector can contact the rear surface of the first panel and the rear surface of the second panel. In this manner, movement of the first and second panels along the vertical direction can be restrained. In alternative implementations, the light reflector can be spaced apart from the first panel and the second panel along the vertical direction. More specifically, a gap can be defined between the light reflector and the first and second panels. In this way, the first panel and the second panel can each move along the vertical direction between the light reflector and a frame supporting the first and second panels.

In some implementations, the first panel and the second panel are separated to define an opening in the lateral direction. Additionally, at least a portion of the light reflector can be positioned above the opening in the vertical direction and extend in the lateral direction between the first panel and the second panel. In this manner, light emitted from the first panel and second panels can exit the lighting fixture at a location different than the first and second panels. More specifically, light can exit the location via the opening defined between the first and second panels.

In some implementations, the first panel can include a third edge extending between the front surface of the first panel and the rear surface of the first panel. Furthermore, the second panel can include a fourth edge extending between the front surface of the second panel and the rear surface of the second panel. In some implementations, the at least one light source can include a first set of one or more LEDs positioned adjacent to the third edge and a second set of one or more LEDs positioned adjacent to the fourth edge. In this manner, the first panel can emit light from the first edge. In addition, the second panel can emit light from the second edge.

In some implementations, the lighting fixture can include a third panel. The third panel can be positioned between the first and second panels along the lateral direction. More specifically, the third panel can be spaced apart from the first and second panels along the vertical direction. For instance, the third panel can be positioned below the first and second panels along the vertical direction. In this manner, the lighting fixture can define a mixing chamber or integrating cavity between the first and second panels along the vertical direction and between the light reflector and third panel along the vertical direction. Light emitted from the first light source can enter the integrating cavity via an emitting edge of the first panel. Likewise, light emitted from the second light source can enter the integrating cavity via an emitting edge of the second panel. Once inside the integrating cavity, light can reflect off of the light reflector and travel downwards along the vertical direction towards the third panel. The third panel can be transparent or semi-transparent. In this manner, reflected rays of light can exit the lighting fixture via the third panel.

The lighting fixture of the present disclosure provides a number of technical benefits. For example, the illuminated surface allows the lighting fixture to repurpose light emitted from an emitting edge of at least one of the first panel and the second panel. More specifically light can be reflected off the light reflector and pass through the third panel. In this manner, light can exit the lighting fixture at a location that is different than the first and second panel. More specifically, light can exit the lighting fixture via the third panel.

As used herein, a "lighting fixture" refers to a device used to provide light or illumination using one or more light sources. In addition, the terms "first" and "second" may be used interchangeably to distinguish one component from another and are not intended to signify location or importance of the individual components.

Referring now to the figures, FIG. 1 depicts a lighting fixture 100 according to an example embodiment of the present disclosure. In some implementations, the lighting fixture 100 can be removably mounted to a ceiling 110 that separates separate a first space 112 (e.g., positioned beneath the ceiling 110) from a second space 114 (e.g., positioned above the ceiling 110) along a vertical direction V. More specifically, at least a portion of the lighting fixture 100 can be recessed within an opening defined by the ceiling 110. In some implementations, the lighting fixture can be installed in a standard drop-ceiling frame. It should be appreciated that the lighting fixture can be implemented in any suitable size. For instance, the lighting fixture 100 can have a standard 1 foot (ft) by 1 foot dimension, 2 ft by 2 ft dimension, 2 ft by 4 ft dimension or any other desired dimension according to a desired implementation. In some implementations, a single lighting fixture 100 may be installed in either a narrow-guide ceiling frame or a standard-guide ceiling frame. For instance, the frame of the lighting fixture 100 can be attached directly to some ceiling frames, while a connector may be used to attach the frame of the lighting fixture 100 to other ceiling frames.

Figure 2:
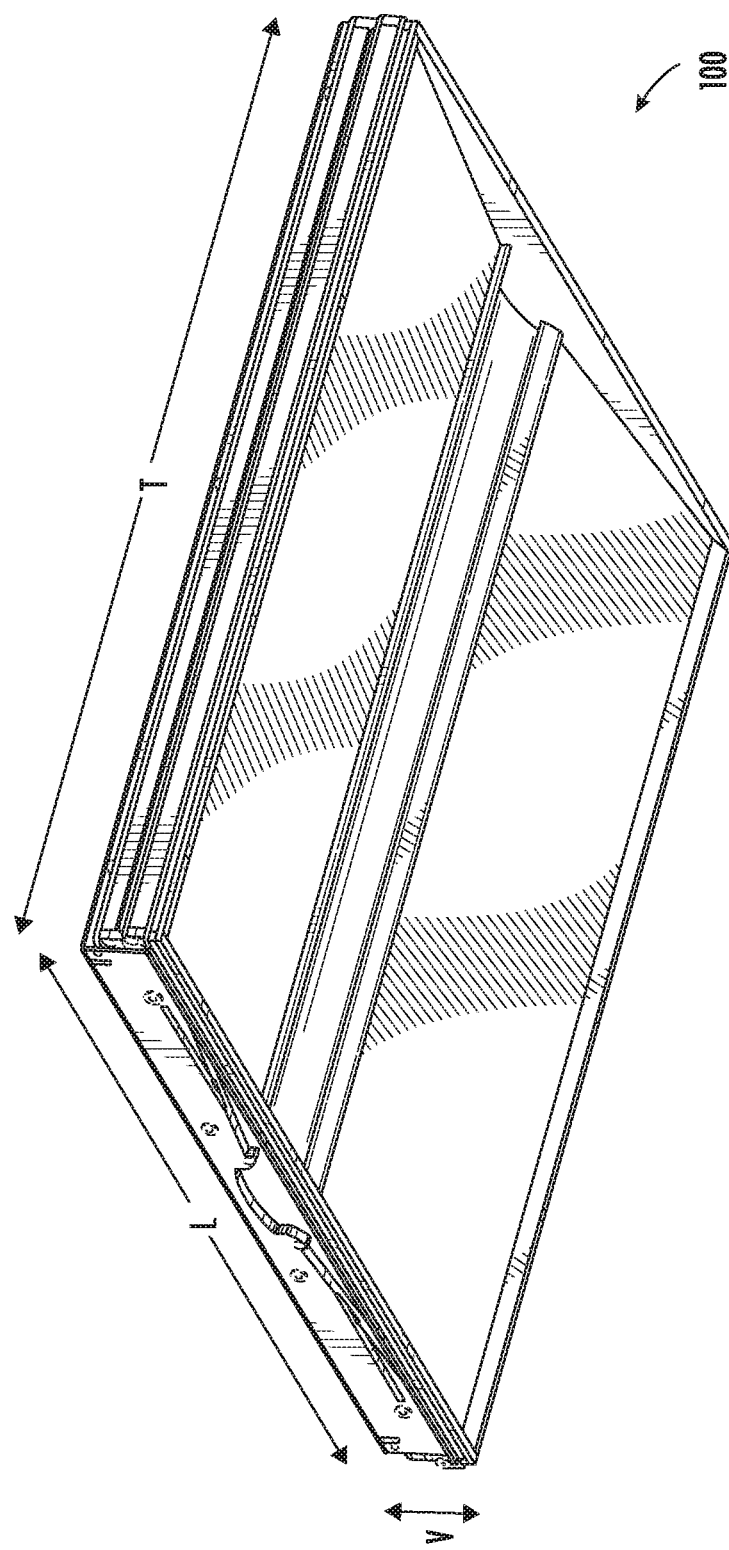
FIG. 2 depicts a bottom perspective view of a lighting fixture according to example embodiments of the present disclosure.
Figure 3:
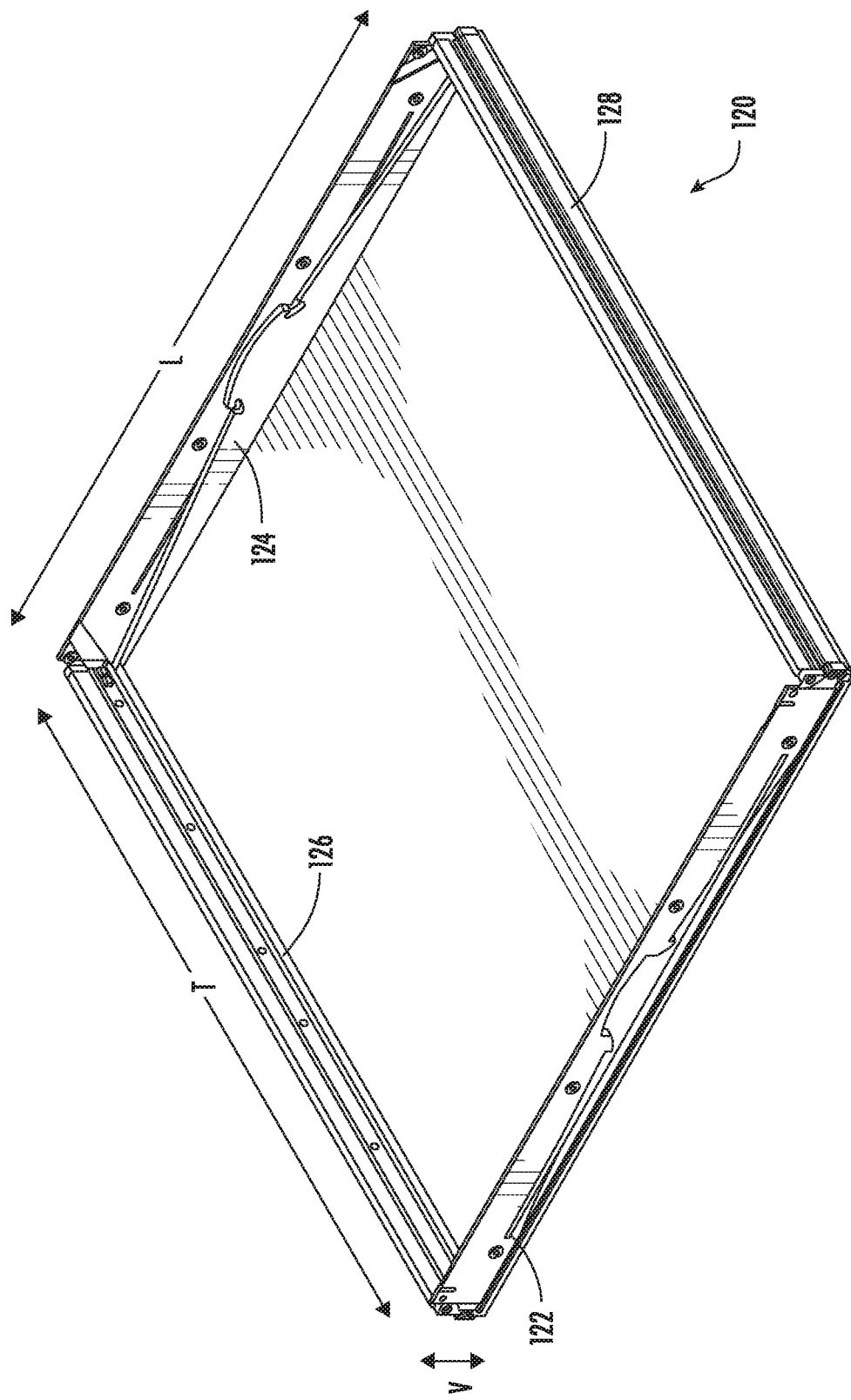
FIG. 3 depicts a frame of a lighting fixture according to example embodiments of the present disclosure.
Figure 4:
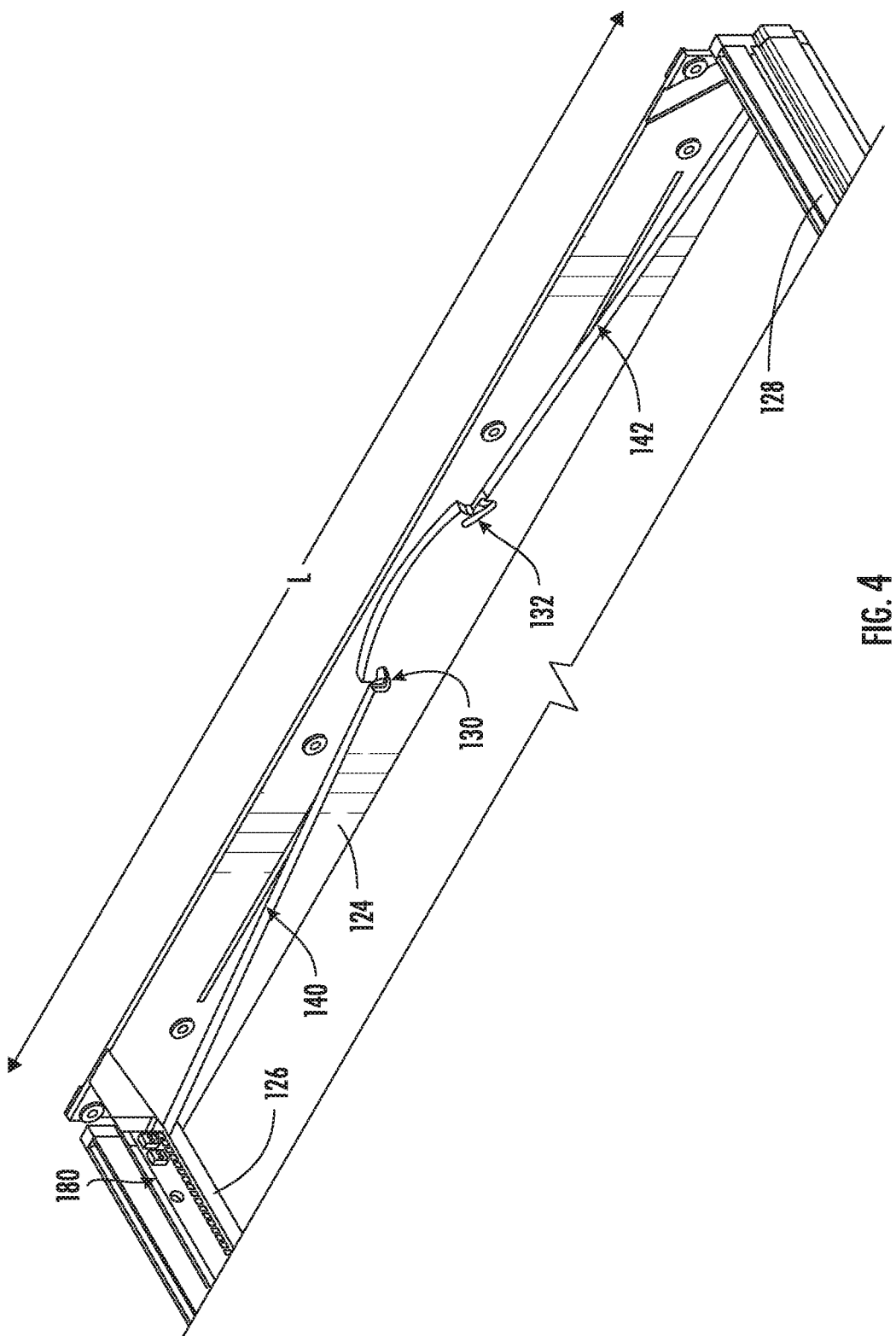
FIG. 4 depicts a portion of the frame depicted in FIG. 3.

Referring now to FIGS. 2 through 4, the lighting fixture 100 defines a lateral direction L, a transverse direction T, and a vertical direction V. The lighting fixture 100 can include a frame 120. In some implementations, the frame 120 can include a first end 122 and a second end 124 spaced apart from the first end 122 along the transverse direction T. Additionally, the frame 120 can include a first side 126 and a second side 128 spaced apart from the first side 126 along the lateral direction L. The first side 126 and the second side 128 can, as shown, each extend along the transverse direction T between the first and second ends 122, 124. In some embodiments, the first side 126 and the second side 128 can each be fastened to the first end 122 and the second end 124 via one or more fasteners. For instance, the sides 126, 128 and ends 122, 124 can be secured to one another via a plurality of screws. More specifically, the plurality of screws can include self-tapping screws. In some implementations, the frame 120, including the sides 126, 128 and ends 122, 124, may be formed as a single component. Any type, number, and/or combination of components may be used to fabricate the sides and ends.

In some implementations, the first end 122 and the second end 124 can each define a first notch 130 and a second notch 132. As shown, the first notch 130 and the second notch 132 can be spaced apart from one another along the lateral direction L. Alternatively or additionally, the first end 122 and the second end 124 can each include a first projection 140 and a second projection 142. In some implementations, the first projection 140 can extend along the lateral direction L between the first notch 130 and the first side 126 of the frame 120. The second projection 142 can, as shown, extend along the lateral direction L between the second notch 132 and the second side 128 of the frame 120.

In some implementations, the first projection 140 can be sloped. For instance, a portion of the first projection 140 adjacent to the first notch 130 can be spaced apart from a portion of the first projection 140 adjacent to the first side 126 along the vertical direction V. More specifically, the portion adjacent the first notch 130 can be positioned above the portion adjacent the first side 126. In this manner, the first projection 140 can slope downward along the lateral direction L between the first notch 130 and the first side 126.

Alternatively or additionally, the second projection 142 can be sloped. For instance, a portion of the second projection 142 adjacent to the second notch 132 can be spaced apart from a portion of the second projection 142 adjacent to the second side 128 along the vertical direction V. More specifically, the portion adjacent the second notch 132 can be positioned above the portion adjacent the second side 128. In this manner, the second projection 142 can slope downward along the lateral direction L between the second notch 132 and the second side 128

Figure 5:
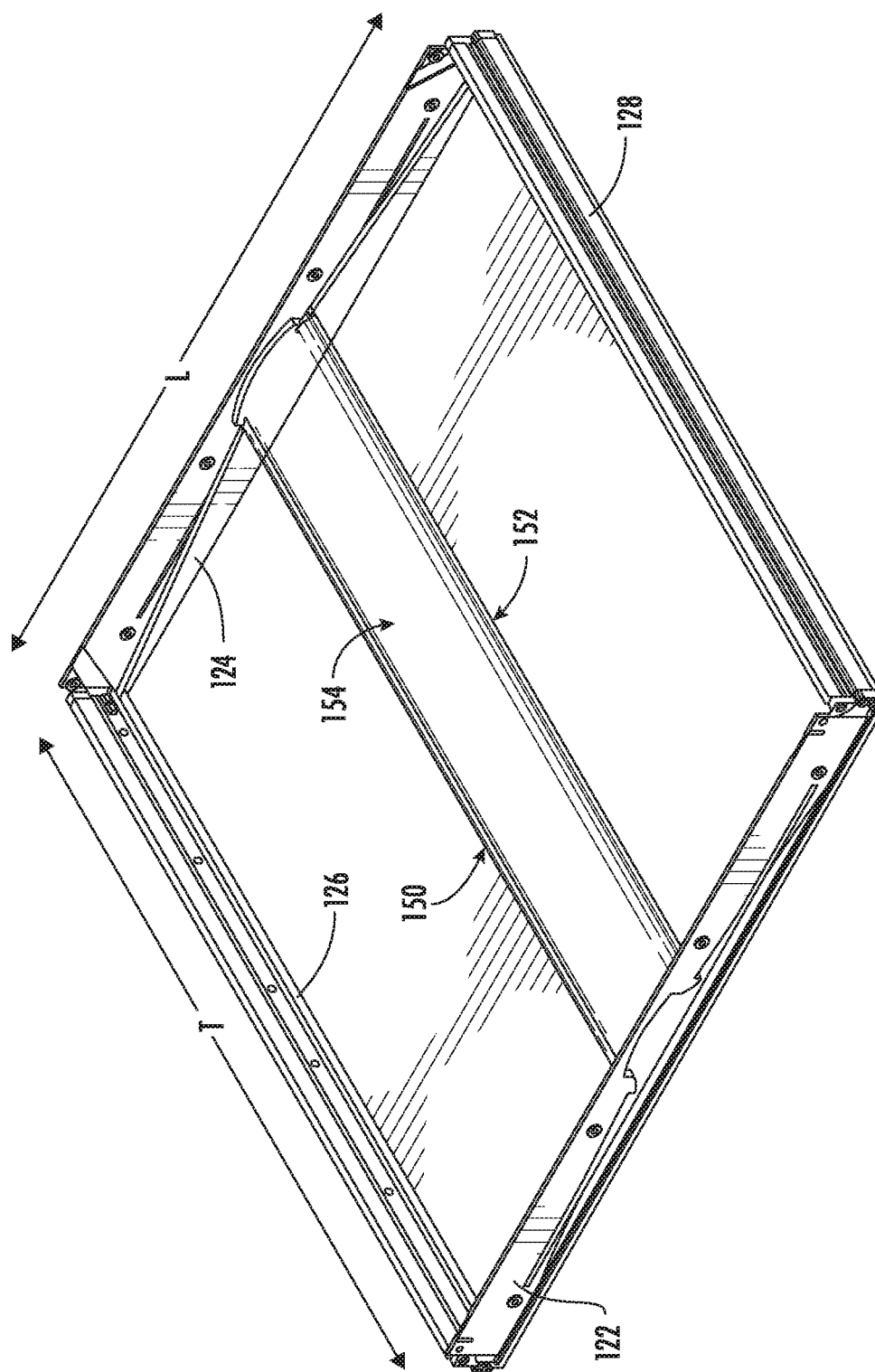
FIG. 5 depicts the frame of FIG. 3 supporting a pair of rails according to example embodiments of the present disclosure.

Referring now to FIG. 5, the lighting fixture 100 can include a first rail 150 and a second rail 152. In some implementations, the first and second rails 150, 152 can be removably coupled to the frame 120 via one or more fasteners, such as screws. More specifically, the first rail 150 and the second rail 152 can each be removably coupled to the first and second ends 122, 124 of the frame 120. In some implementations, at least a portion of the first rail 150 can be retained within the first notch 130. Alternatively or additionally, at least a portion of the second rail 152 can be retained within the second notch 132. When the first rail 150 and the second rail 152 are each removably coupled to the frame 120, the first rail 150 and the second rail 152 can, as shown, extend along the transverse direction T from the first end 122 of the frame 120 to the second end 124 of the frame 120. In addition, the first rail 150 and the second rail 152 can, as shown, be spaced apart from one another along the lateral direction L. In this manner, a gap 154 can be defined between the first rail 150 and the second rail 152 along the lateral direction L. As will be discussed below in more detail, the first rail 150 and second rail 152 can support one or more panels of the lighting fixture 100.

Figure 6:
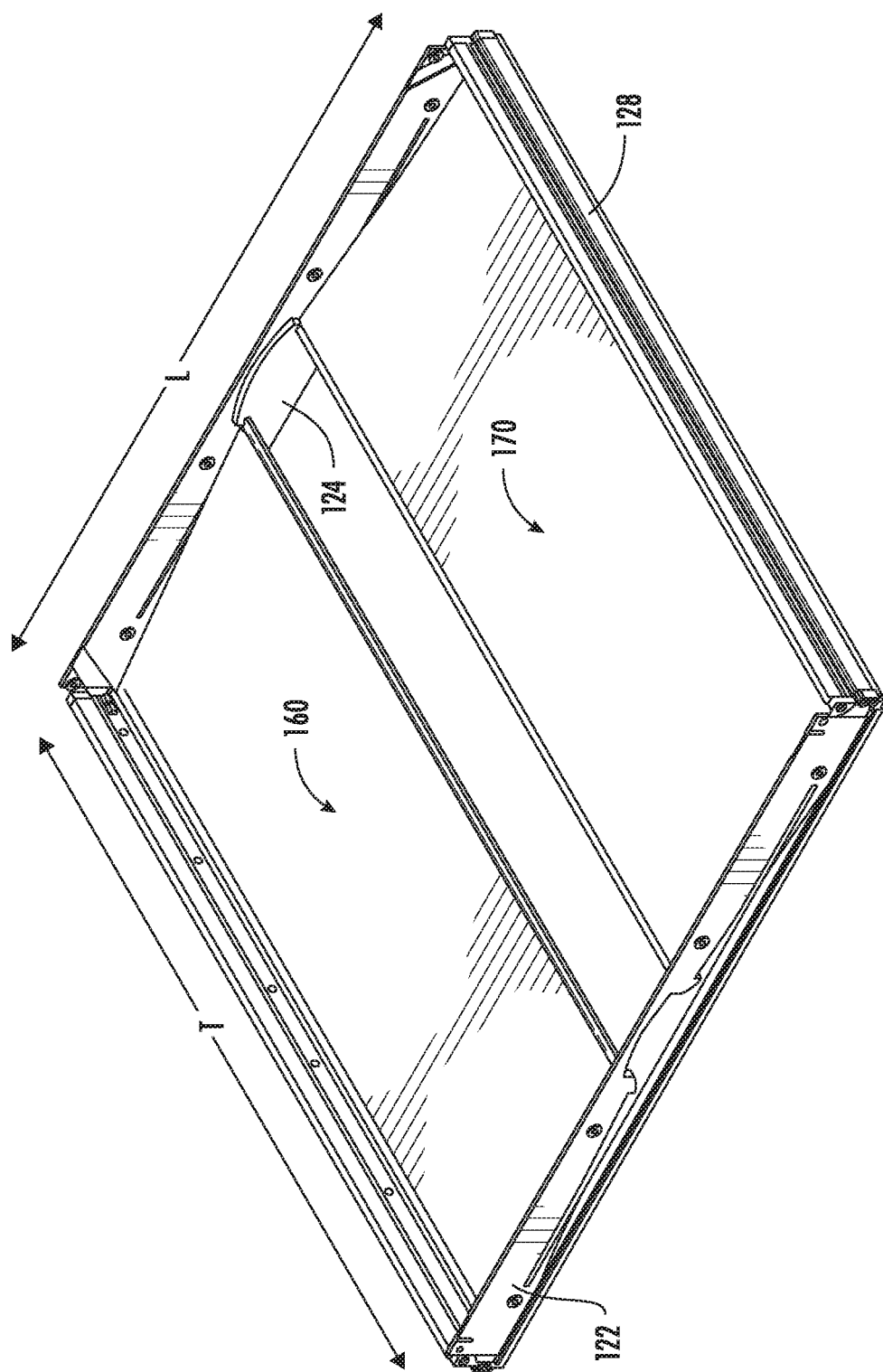
FIG. 6 depicts the frame of FIG. 3 supporting a pair of panels according to example embodiments of the present disclosure.
Figure 7:
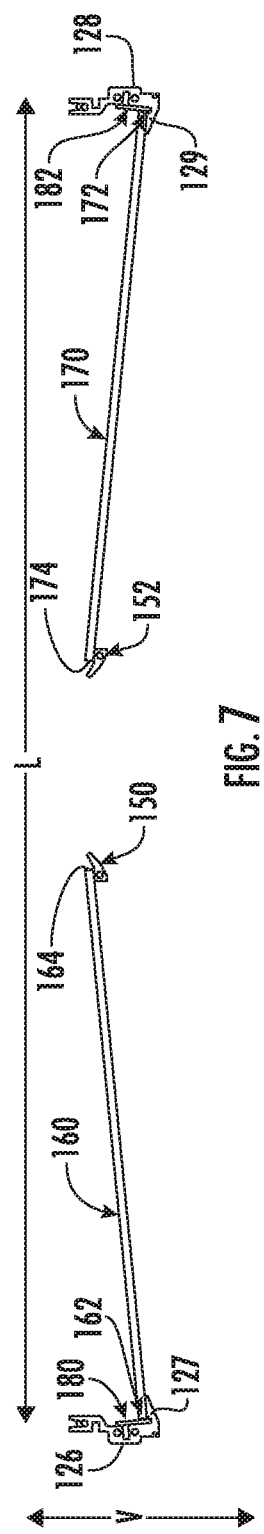
FIG. 7 depicts a cross-sectional view of FIG. 6 according to example embodiments of the present disclosure.
Figure 8:
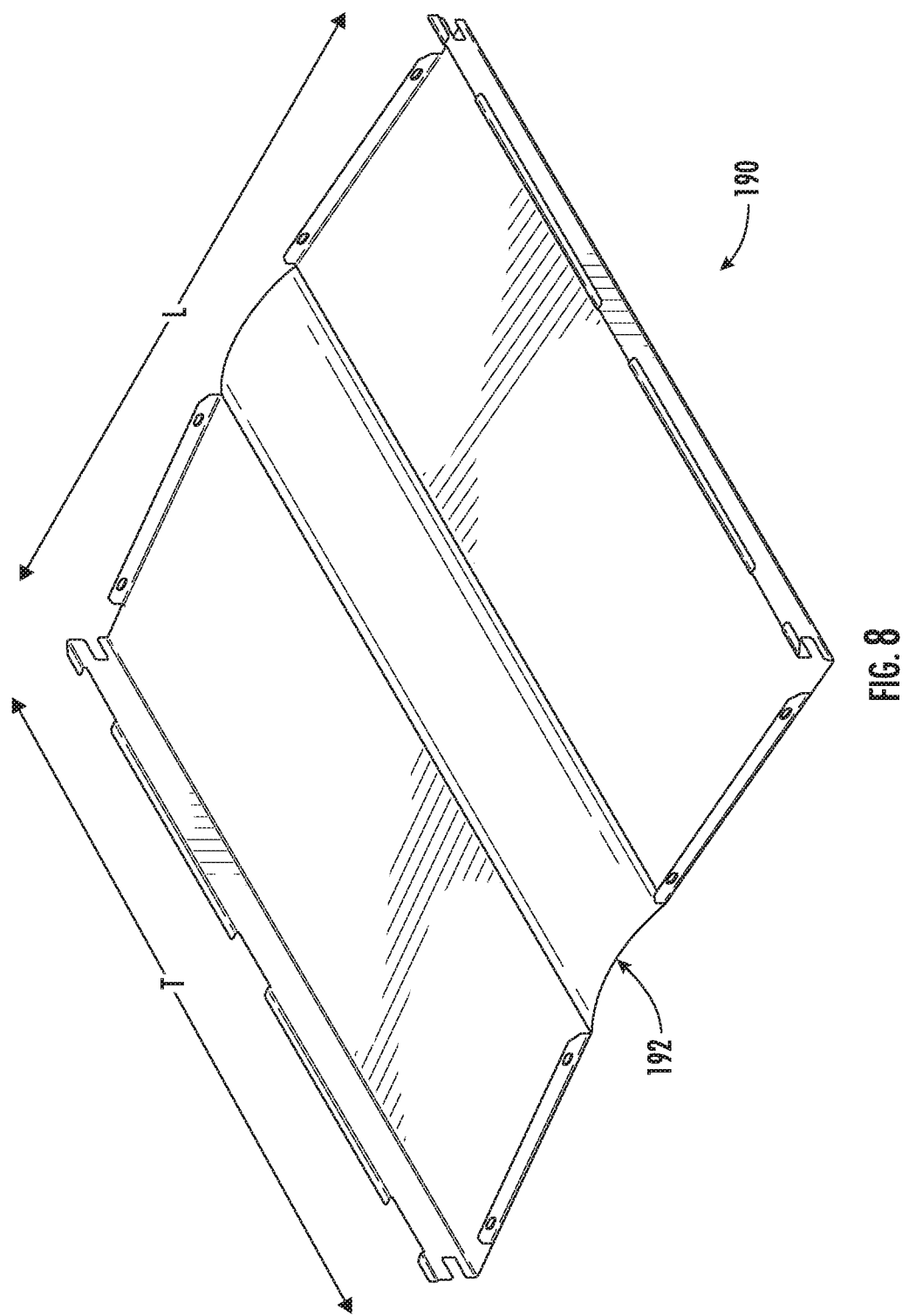
FIG. 8 depicts an illuminated surface of a lighting fixture according to example embodiments of the present disclosure.
Figure 9:
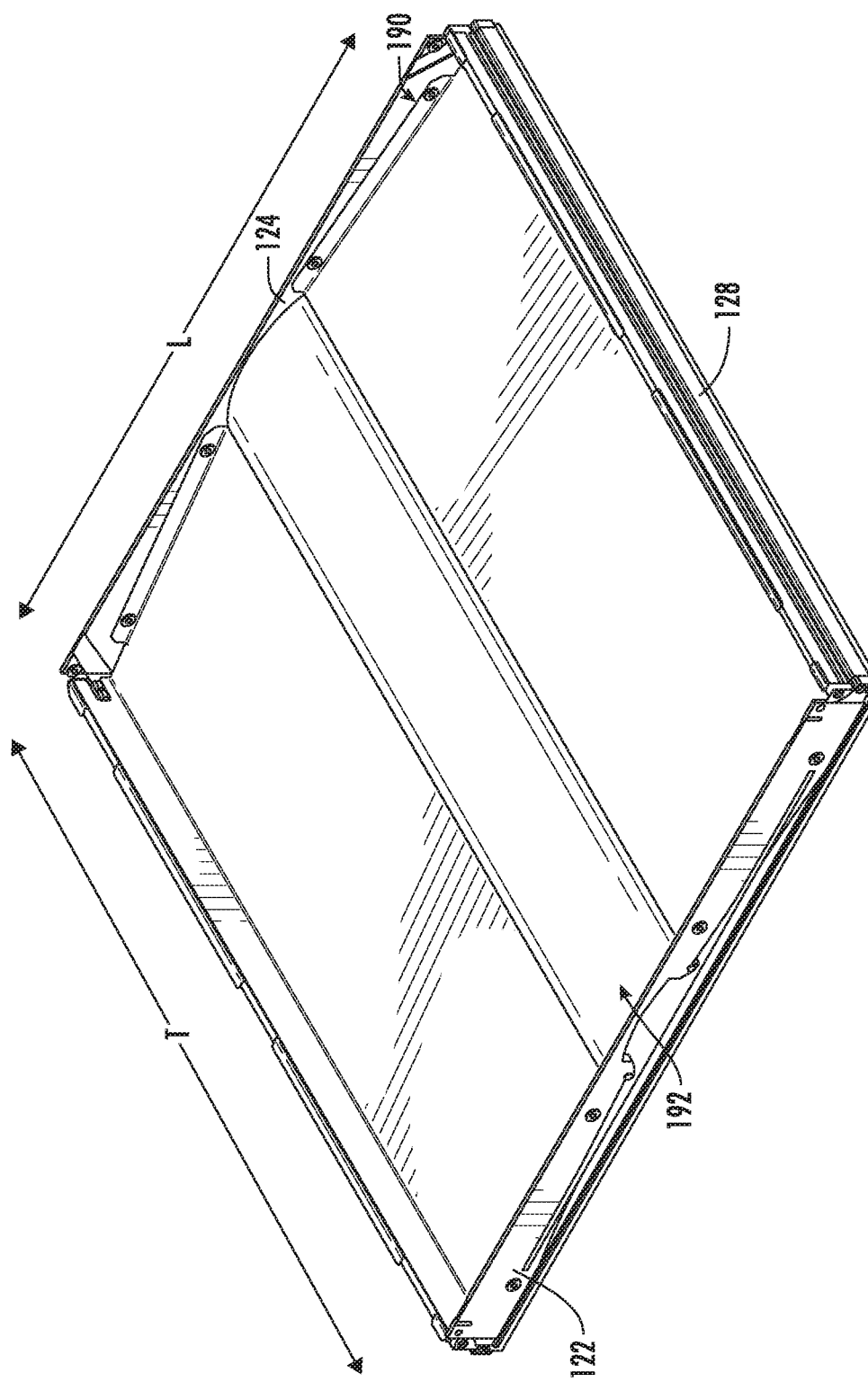
FIG. 9 depicts a perspective view of the illuminated surface of FIG. 8 mounted to the frame of FIG. 3 according to example embodiments of the present disclosure.
Figure 10:
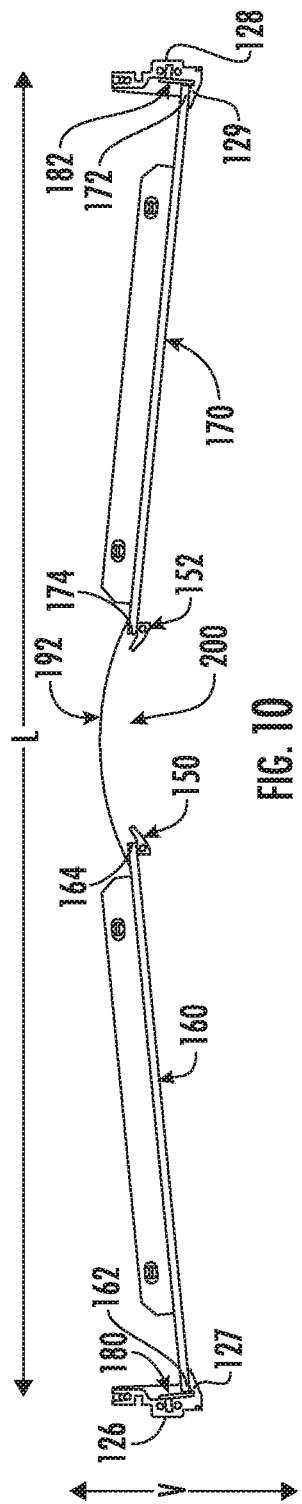
FIG. 10 depicts a cross-sectional view of FIG. 9 according to example embodiments of the present disclosure.
Figure 11:
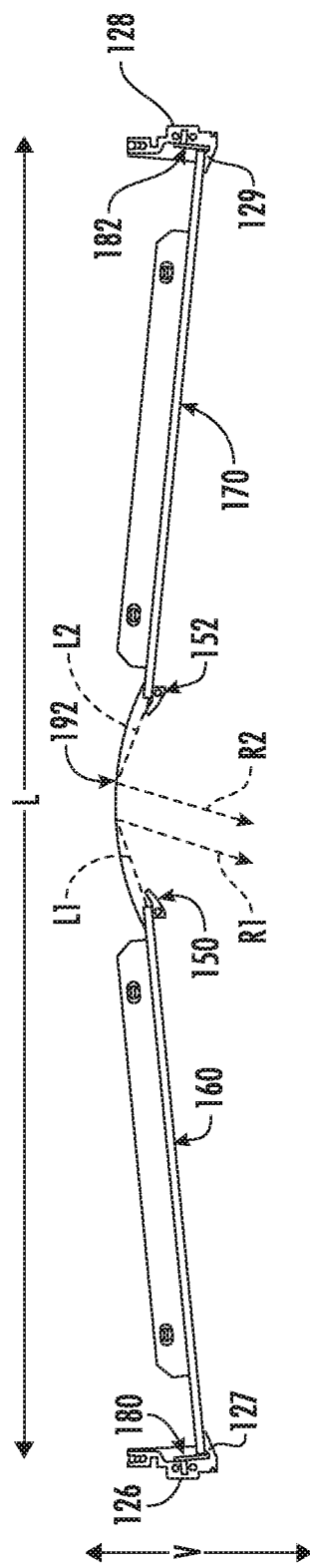
FIG. 11 depicts another cross-sectional view of FIG. 9 according to example embodiments of the present disclosure.

Referring now to FIGS. 6 and 7, the lighting fixture 100 (FIG. 1) can include a first panel 160. The first panel 160 can include a plurality of surfaces (e.g., a front surface and a rear surface) and at least one edge formed therebetween. As shown, the first panel 160 can extend along both the lateral direction L and the transverse direction T. More specifically, the first panel 160 can extend along the lateral direction L between the first rail 150 and the first side 126 of the frame 120. Additionally, the first panel 160 can extend along the transverse direction T between the first end 122 of the frame 120 and the second end 124 of the frame 120. In some implementations, the first panel 160 can be supported, at least in part, by the first projection 140 (FIG. 4) of the first end 122 of the frame 120 and the first projection 140 of the second end 124 of the frame 120.

Alternatively or additionally, the first panel 160 can be supported, at least in part, by the first rail 150 and the first side 126 of the frame 120. In some implementations, the first panel 160 can rest on a lip 127 of the first side 126. The lip 127 can, in some implementations, be spaced apart from the first rail 150 along the vertical direction V. More specifically, the lip 127 can be positioned below the first rail 150 along the vertical direction V. In this manner, a plane defined by the first panel 160 can intersect a plane defined by the frame 120 at an angle. In some implementations, the lip 127 is integrally formed with the first side 126. In other embodiments, however, the lip 127 can be a separate component that is attachable to the first side 126 of the frame 120.

Still referring to FIGS. 6 and 7, the lighting fixture 100 can, as shown, include a second panel 170 spaced apart from the first panel 160 along the lateral direction L. The second panel 170 can include a plurality of surfaces (e.g., a front surface and a rear surface) and at least one edge formed therebetween. As shown, the second panel 170 can extend along both the lateral direction L and the transverse direction T. More specifically, the second panel 170 can extend along the lateral direction L between the second rail 152 and the second side 128 of the frame 120. Additionally, the second panel 170 can extend along the transverse direction T between the first end 122 of the frame 120 and the second end 124 of the frame 120. In some implementations, the second panel 170 can be supported, at least in part, by the second projection 142 (FIG. 4) of the first end 122 of the frame 120 and the second projection 142 of the second end 124 of the frame 120.

Alternatively or additionally, the second panel 170 can be supported, at least in part, by the second rail 152 and the second side 128 of the frame 120. In some implementations, the second panel 170 can rest on a lip 129 of the second side 128. The lip 129 can, in some implementations, be spaced apart from the second rail 152 along the vertical direction V. More specifically, the lip 129 can be positioned below the second rail 152 along the vertical direction V. In this manner, a plane defined by the second panel 170 can intersect a plane defined by the frame 120 at an angle. In some embodiments, the lip 129 is integrally formed with the first side 126. In other embodiments, however, the lip 129 can be a separate component that is attachable to the second side 128 of the frame 120.

In some implementations, the first panel 160 can include a first light guide having a receiving edge 162 and an emitting edge 164. The receiving edge 162 of the first light guide can be positioned adjacent a first light source 180 of the lighting fixture 100. It should be appreciated that the receiving edge 162 of the first light guide is positioned adjacent the first light source 180 such that light emitted from the first light source 180 illuminates the receiving edge 162 of the first light guide. In some implementations, the first light source 180 can be coupled to the first rail 150. In alternative implementations, the first light source 180 can be coupled to the first side 126 of the frame 120. In such implementations, the receiving edge 162 can be positioned adjacent the first side 126. In this manner, the first light guide can, as will be discussed below in more detail, be illuminated via the first light source 180.

When the first light source 180 is active (e.g., powered on), at least a portion of light emitted from the first light source 180 can enter the first light guide via the receiving edge 162. In some implementations, the first light guide is etched to transmit light from the receiving edge 162 to the emitting edge 164. In some implementations, the emitting edge 164 of the first light guide can be positioned adjacent the first rail 150. In this manner, light emitted via the emitting edge 164 of the first light guide can be emitted adjacent the first rail 150.

In some implementations, the second panel 170 can include a second light guide having a receiving edge 172 and an emitting edge 174. The receiving edge 172 of the second light guide can be positioned adjacent a second light source 182 of the lighting fixture 100. It should be appreciated that the receiving edge 172 of the second light guide is positioned adjacent the second light source 182 such that light emitted from the second light source 182 illuminates the receiving edge 172 of the second light guide. In some implementations, the second light source 182 can be coupled to the second rail 152. In alternative implementations, the second light source 182 can be coupled to the second side 128 of the frame 120. In such implementations, the receiving edge 172 can be positioned adjacent the second side 128. In this manner, the second light guide can, as will be discussed below in more detail, be illuminated via the second light source 182.

When the second light source 182 is active (e.g., powered on), at least a portion of light emitted from the second light source 182 can enter the second light guide via the receiving edge 172. In some embodiments, the second light guide is etched to transmit light from the receiving edge 172 to the emitting edge 174. In some implementations, the emitting edge 174 of the second light guide can be positioned adjacent the second rail 152. In this manner, light emitted via the emitting edge 174 of the second light guide can be emitted adjacent the second rail 152.

It should be appreciated that the first light source 180 and the second light source 182 can each include any suitable light source. For instances, the first light source 180 can include a first set of one or more LEDs, and the second light source 182 can include a second set of one or more LEDs. Alternatively, the first light source 180 can include a first set of one or more fluorescent light sources, and the second light source 182 can include a second set of one or more fluorescent light sources.

As mentioned above, the first light source 180 and the second light source 182 can be positioned adjacent the first rail 150 and the second rail 152, respectively. In some implementations, the first light source 180 and the second light source 182 can be positioned on a same circuit board. More specifically, a first edge or portion of the circuit board can include a first set one or more LEDs associated with the first light source 180. Additionally, a second edge or portion of the circuit board can include a second set of one or more LEDs associated with the second light source 182.

In some implementations, the first rail 150 and the second rail 152 can each be angled relative to a plane defined by a rear surface of the first light guide and the second light guide, respectively. As will be discussed below in more detail, the first rail 150 and the second rail 152 can each be angled relative to the plane to direct light towards an illuminated surface of the lighting fixture 100.

Referring now to FIGS. 8 through 11, the lighting fixture 100 can include an illuminated surface 190. As shown, the illuminated surface 190 can include a light reflector configured to reflect light emitted from at least one of the first panel 160 and the second panel 170. The light reflector can extend adjacent a first surface of the first panel 160 and a second surface of the second panel 170. In some embodiments, the light reflector can reflect light emitted from the emitting edge 164 (FIG. 7) of the first light guide 160. Alternatively or additionally, the light reflector can reflect light emitted from the emitting edge 174 (FIG. 7) of the second light guide 170.

In some embodiments, the light reflector is configured to restrain or limit movement of both the first panel 160 and the second panel 170 along the vertical direction V. For instance, the light reflector can contact a first surface of the first panel 160 and a second surface of the second panel 170. More specifically, the first surface can include a rear surface of the first panel 160, and the second surface can include a rear surface of the second panel 170. In this manner, the light reflector can restrain movement of the both the first panel 160 and the second panel 170 along the vertical direction V. Alternatively, the light reflector can be spaced apart from the first panel 160 and the second panel 170 along the vertical direction V such that a gap is defined therebetween. For instance, the light reflector can be spaced apart from the first panel 160 and the second panel 170 such that about a 2 millimeter (mm) gap is defined therebetween. In this manner, the first panel 160 and the second panel 170 can each move along the vertical direction V between the frame 120 and the light reflector, but such movement can be limited.

In some implementations, at least a portion 192 of the light reflector extends in the lateral direction L at a height above a highest point of the first panel 160 and a highest point of the second panel 170. More specifically, the at least a portion 192 of the light reflector can extend in the lateral direction L between the emitting edge 164 of the first panel 160 and the emitting edge 174 of the second panel 170. In some implementations, the at least a portion 192 of the light reflector can be positioned directly above the gap 154 (FIG. 5) defined between the first rail 150 and the second rail 152 along the lateral direction L. As will be discussed below in more detail, light reflecting off of the light reflector can illuminate the gap 154.

In some implementations, the at least a portion 192 of the light reflector can be curved. More specifically, the at least a portion 192 of the light reflector can be concave. In this manner, light reflected off of the at least a portion 192 of the light reflector can be spread out along at least the lateral direction L.

In some implementations, the lighting fixture 100 can define a mixing chamber or integrating cavity 200. More specifically, the integrating cavity 200 can be defined, at least in part, along the lateral direction L between the emitting edge 164 of the first panel 160 and the emitting edge 174 of the second panel 170. Additionally, the integrating cavity 200 can be defined, at least in part, along the vertical direction V between the at least a portion 192 of the light reflector and the emitting edge 164, 174 of the first and second panels 160, 170, respectively.

As shown, a first ray L1 of light exiting the first panel 160 via the emitting edge 164 thereof can reflect off of the at least a portion 192 of the light reflector and exit the lighting fixture 100 as a first reflected ray R1 of light. More specifically, the first reflected ray R1 of light can exit the lighting fixture 100 at a location different than the first panel 160. Alternatively or additionally, a second ray of L1 of light exiting the second panel 170 via the emitting edge 174 thereof can reflect off of the at least a portion 192 of the light reflector and exit the lighting fixture 100 as a second reflected ray R2 of light. More specifically, the second reflected ray R2 of light can exit the lighting fixture 100 at a location different than the second panel 170. In some embodiments, the location that is different than the first and second panels 160, 170 can be the gap 154 (FIG. 5) defined between the first and second rails 150, 152 along the lateral direction L.

Figure 12:
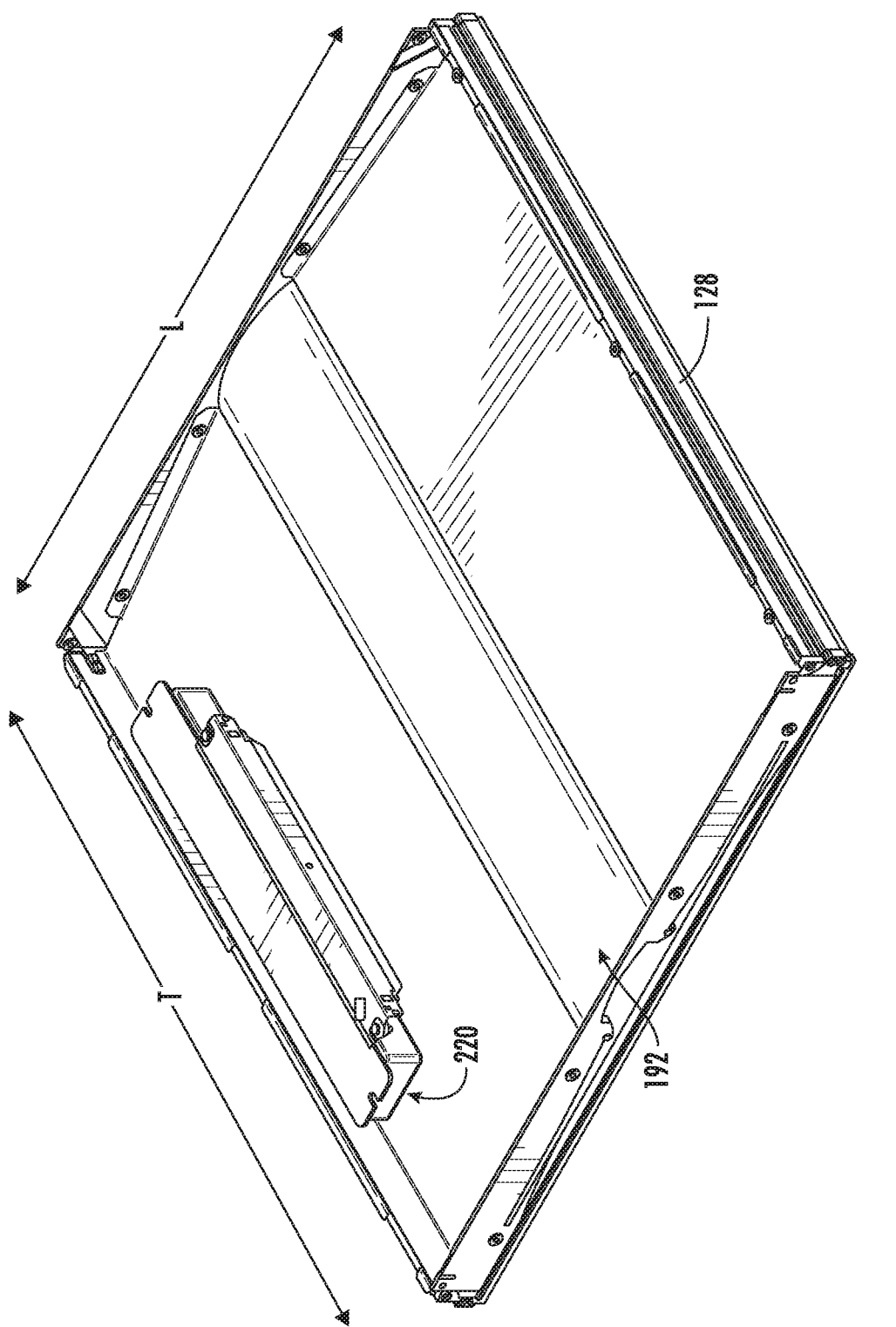
FIG. 12 depicts electrical components of the lighting fixture of FIG. 2 according to example embodiments of the present disclosure.
Figure 13:
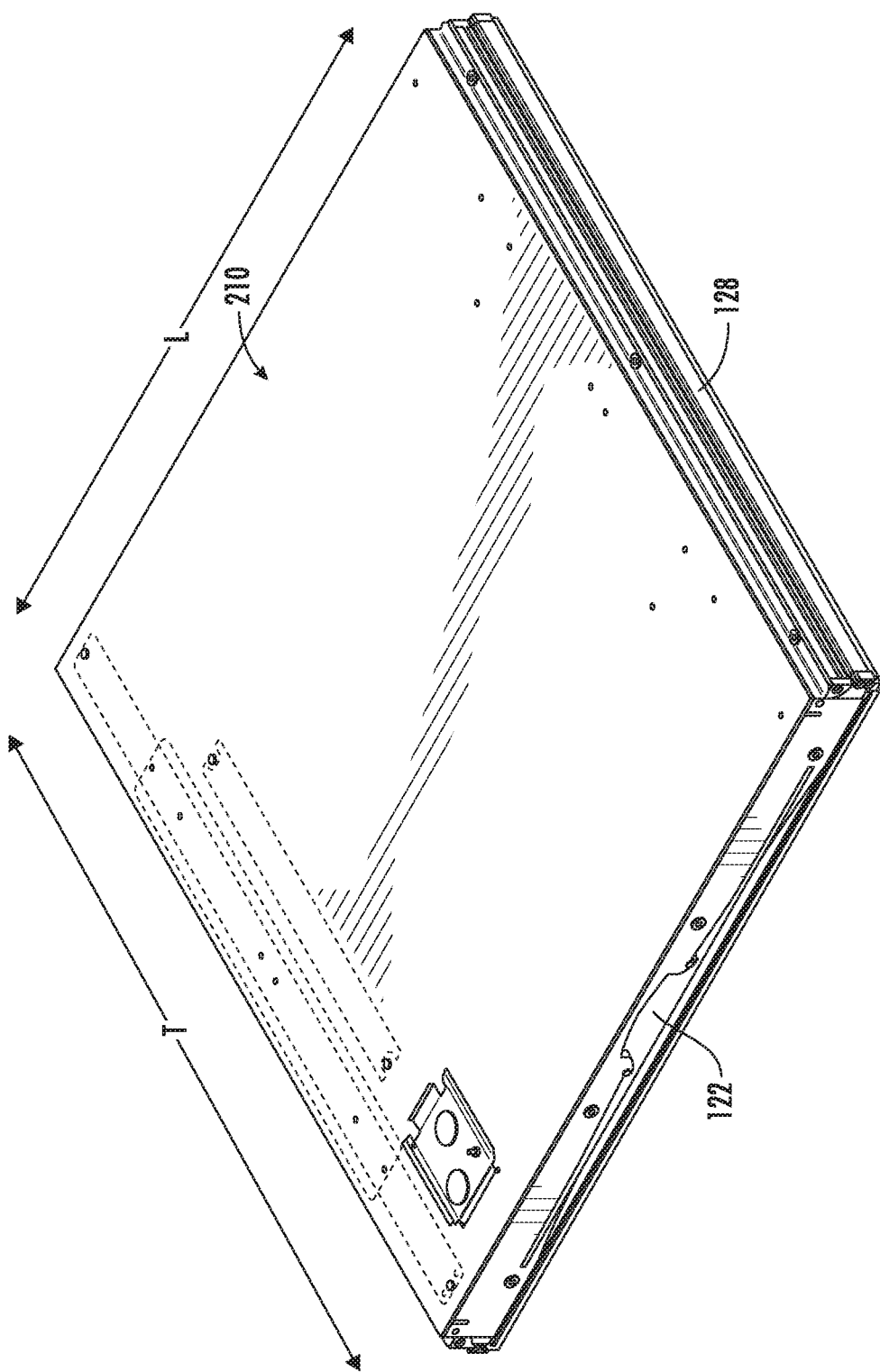
FIG. 13 depicts a top-perspective view of the lighting fixture of FIG. 2.

Referring now to FIGS. 12 and 13 in combination, the light fixture 100 can include one or more electrical components 220 positioned between the light reflector 190 and a top portion 210 of the frame 120. In some implementations, the one or more electrical components 220 can be removably coupled to the top portion 210 of the frame 120 via one or more fasteners. For instance, the one or more electrical components 220 can include an energy storage device, such as a battery. Alternatively or additionally, the one or more electrical components can include a driver for at least one of the first light source 180 (FIG. 7) and the second light source 182 (FIG. 7). More specifically, the driver can be an LED driver. In some implementations, the one or more electrical components 220 can be positioned between the frame 120 and the light reflector along the vertical direction V.

Figure 14:
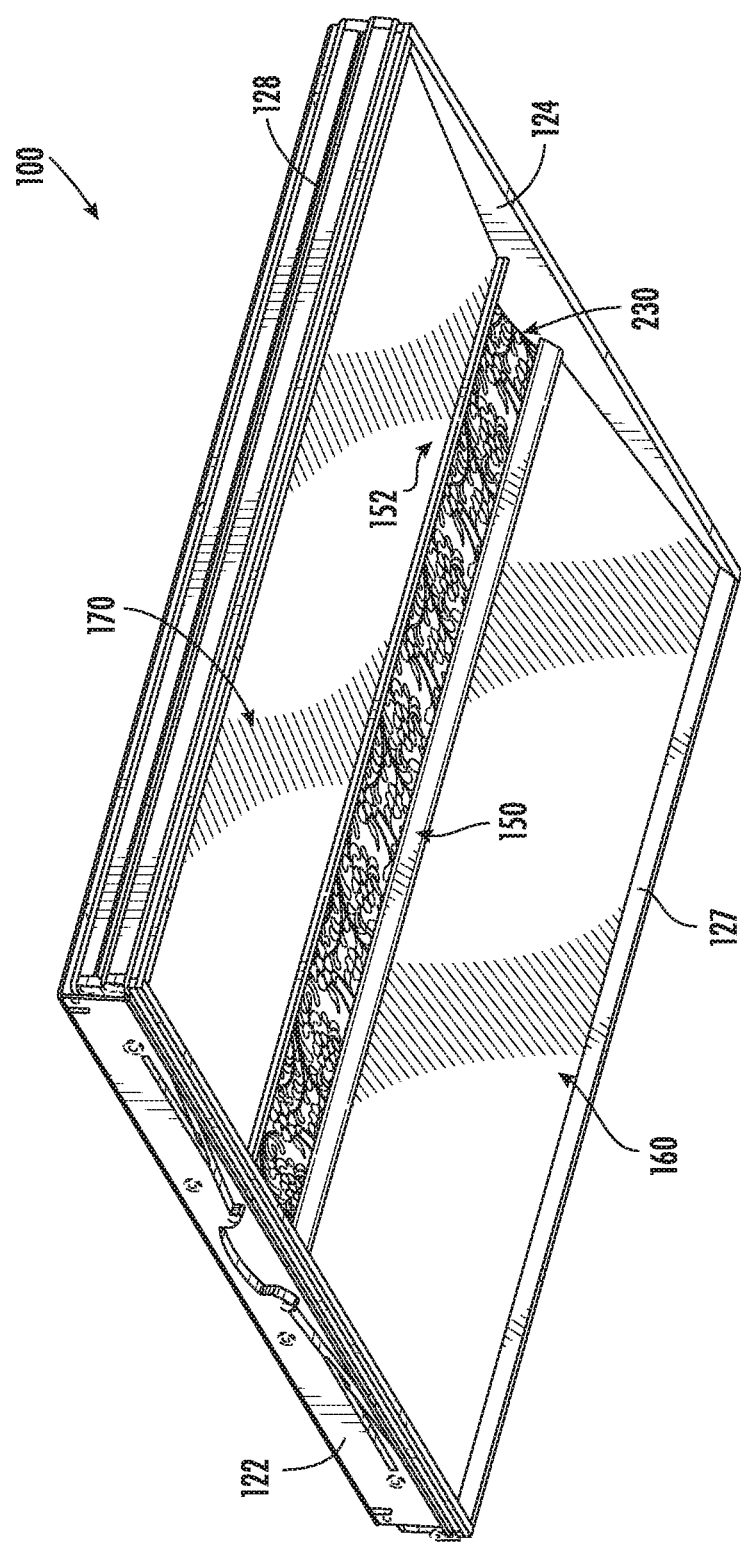
FIG. 14 depicts a bottom-perspective view of a lighting fixture according to example embodiments of the present disclosure.

Referring now to FIG. 14, at least a portion of the light reflector can include a patterned surface 230. For instance, as shown, the at least a portion 192 (FIG. 8) of the light reflector that is visible through the gap 154 (FIG. 5) defined between the first rail 150 and the second rail 152 can include a patterned surface 230. It should be appreciated that the patterned surface 230 depicted in FIG. 14 is illustrative of one example of a patterned surface that can be used for the light reflector. As will be discussed below in more detail, the patterned surface 230 can be customized based on user-preferences.

In some implementations, the patterned surface 230 can correspond to a pattern of wallpaper used on one or more walls of the room or area in which the lighting fixture 100 is located. Alternatively, the patterned surface 230 can correspond to the pattern of the flooring (e.g., hardwood, tile, laminate, linoleum, vinyl, etc.) used in the room or area. In some implementations, the patterned surface 230 can correspond to the pattern of the ceiling in the room or area. It should be appreciated, however, that the patterned surface 230 can correspond to the pattern of any suitable surface of the room or area in which the lighting fixture 100 is located.

In some implementations, the patterned surface 230 can include one or more logos. For instance, the one or more logos can be associated with a sports team (e.g., football, basketball, baseball, etc.). Alternatively, the one or more logos can be associated with a company or individual. It should be appreciated, however, that the one or more logos can be associated with any suitable source (e.g., company, sports team, individual).

Figure 15:
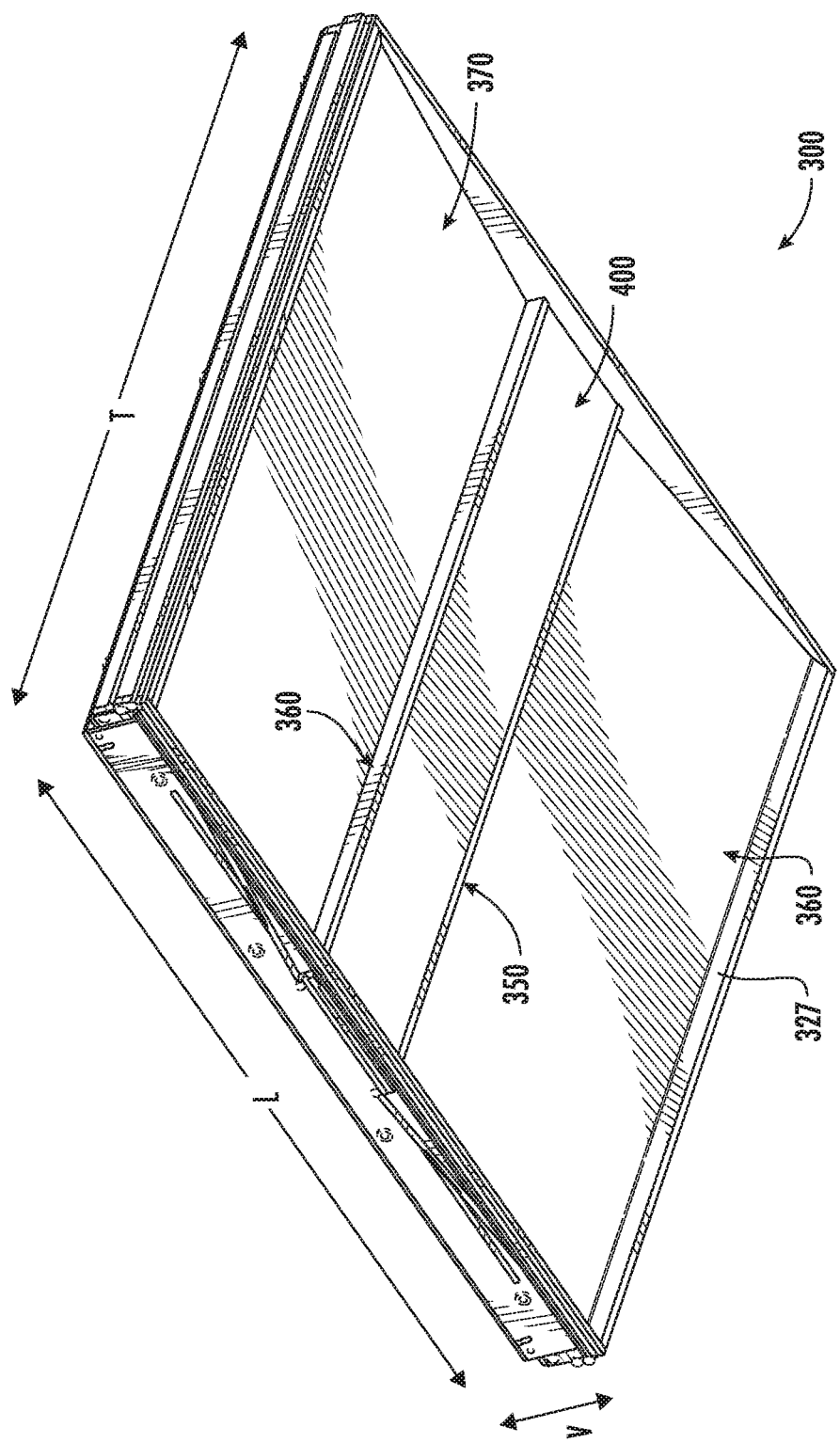
FIG. 15 depicts a bottom-perspective view of a lighting fixture according to example embodiments of the present disclosure.
Figure 16:
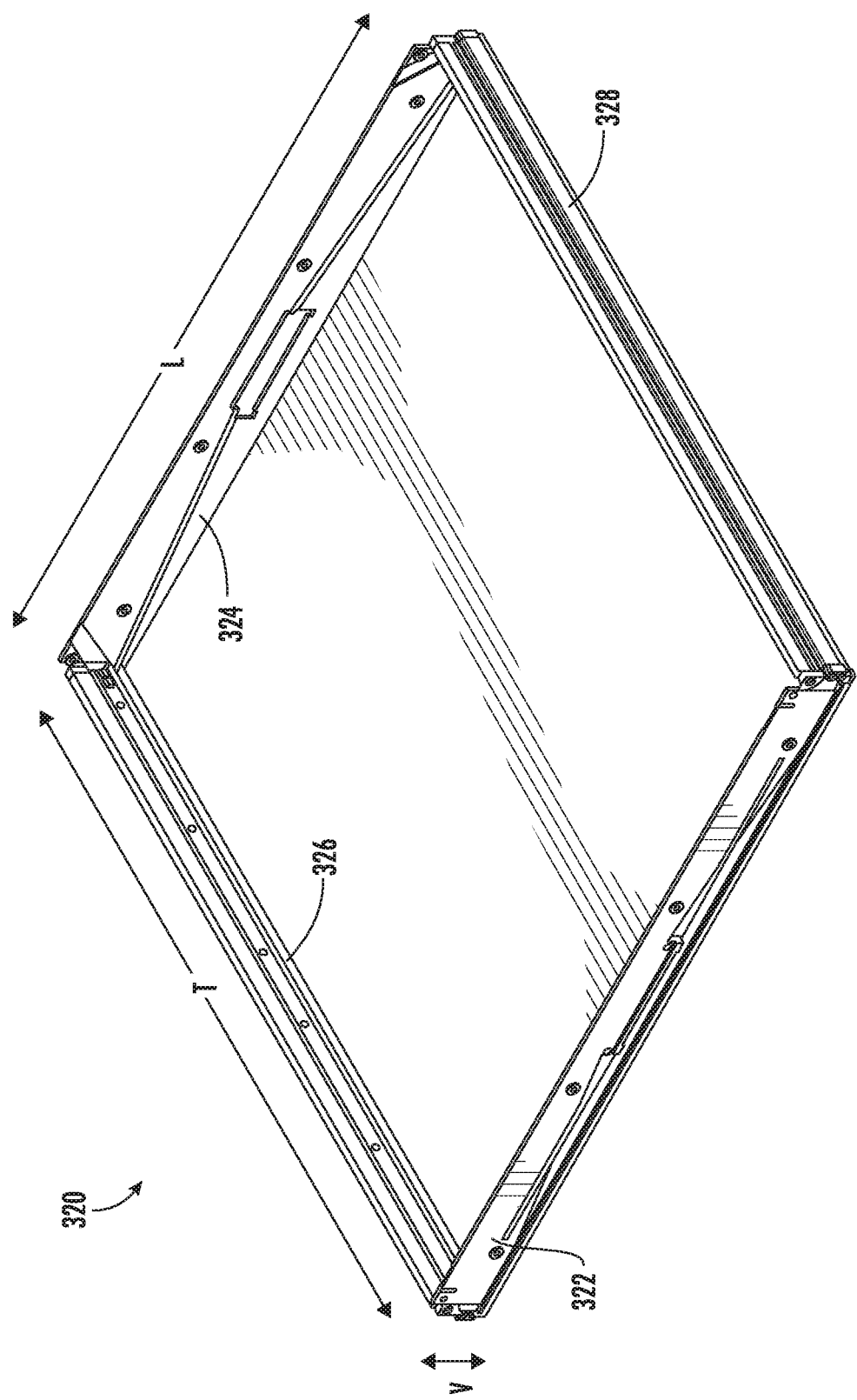
FIG. 16 depicts a frame of a lighting fixture according to example embodiments of the present disclosure.
Figure 17:
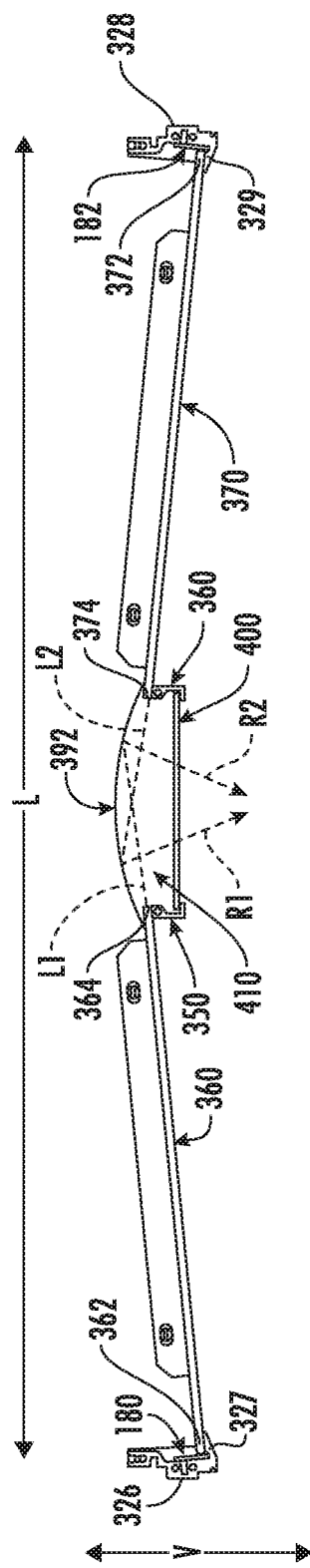
FIG. 17 depicts a cross-sectional view of a lighting fixture according to example embodiments of the present disclosure.

Referring now to FIGS. 15 through 17, another embodiment of a lighting fixture 300 is provided according to example embodiments of the present disclosure. The lighting fixture 300 of FIG. 15 is substantially similar to the lighting fixture 100 discussed above with reference to FIGS. 1 through 14. Accordingly, the same or similar reference numbers may be assigned to the same or similar components. For instance, the lighting fixture 300 of FIG. 15 includes a first panel 360 and a second panel 370. Additionally, the lighting fixture 300 includes an illuminated surface 400. However, in contrast to the lighting fixture 100 of FIG. 2, the lighting fixture 300 of FIG. 15 includes a second illuminated surface 400. More specifically, the second illuminated surface 400 can be a third panel positioned between the first panel 350 and the second panel 360 along the lateral direction L. As shown, the third panel is spaced apart from the first panel 360 and the second panel 370 along the vertical direction V. More specifically, the third panel is positioned below the first panel 360 and the second panel 370 along the vertical direction V. Additionally, the third panel is supported, at least in part, between a first rail 350 of the lighting fixture 300 and a second rail 352 of the lighting fixture 300.

The first panel 360 can include a plurality of surfaces and at least one edge formed therebetween. As shown, the first panel 360 can extend along both the lateral direction L and the transverse direction T. More specifically, the first panel 360 can extend along the lateral direction L between the first rail 350 and the first side 326 of the frame 320. Additionally, the first panel 360 can extend along the transverse direction T between the first and second ends 322, 324 of the frame 320. In some implementations, the first panel 360 can be supported, at least in part, by a first projection (e.g., first projection 140 of FIG. 3) of the first and second ends 322, 324 of the frame 320. Alternatively or additionally, the first panel 360 can be supported, at least in part, by the first rail 350 and the first side 326 of the frame 320. In some implementations, the first panel 360 can rest on a lip 327 of the first side 326. The lip 327 can, in some embodiments, be spaced apart from the first rail 350 along the vertical direction V. More specifically, the lip 327 can be positioned below the first rail 350 along the vertical direction V. In this manner, a plane defined by the first panel 360 can intersect a plane defined by the frame 120 at an angle. In some embodiments, the lip 327 is integrally formed with the first side 326. In other embodiments, however, the lip 327 can be a separate component that is attachable to the first side 326 of the frame 120.

As shown, the second panel 370 can be spaced apart from the first panel 360 along the lateral direction L. The second panel 370 can include a plurality of surfaces and at least one edge formed therebetween. As shown, the second panel 370 can extend along both the lateral direction L and the transverse direction T. More specifically, the second panel 370 can extend along the lateral direction L between the second rail 352 and the second side 328 of the frame 320. Additionally, the second panel 370 can extend along the transverse direction T between the first and second ends 322, 324 of the frame 320. In some implementations, the second panel 370 can be supported, at least in part, by a second projection (e.g., second projection 142 of FIG. 3) of the first and second ends 322, 324 of the frame 120. Alternatively or additionally, the second panel 370 can be supported, at least in part, by the second rail 352 and the second side 328 of the frame 320. In some implementations, the second panel 370 can rest on a lip 329 of the second side 328. The lip 329 can, in some embodiments, be spaced apart from the second rail 352 along the vertical direction V. More specifically, the lip 329 can be positioned below the second rail 352 along the vertical direction V. In this manner, a plane defined by the second panel 370 can intersect a plane defined by the frame 320 at an angle. In some embodiments, the lip 329 can be integrally formed with the second side 328. In other embodiments, however, the lip 329 can be a separate component that is attachable to the second side 328 of the frame 320.

In some implementations, the first panel 360 can include a first light guide having a receiving edge 362 and an emitting edge 364. The receiving edge 362 of the first light guide 360 can be positioned adjacent the first light source 180 of the lighting fixture 100. In some embodiments, the second panel 370 can include a second light guide having a receiving edge 372 and an emitting edge 374. The receiving edge 372 of the second light guide 370 can be positioned adjacent the second light source 182 of the lighting fixture 100.

In some embodiments, the lighting fixture 300 can define a mixing chamber or integrating cavity 410. More specifically, the integrating cavity 410 can be defined, at least in part, along the lateral direction L between the emitting edge 364 of the first panel 360 and the emitting edge 374 of the second panel 370. Additionally, the integrating cavity 410 can be defined, at least in part, along the vertical direction V between the at least a portion 392 of the light reflector and the second illuminated surface (e.g., third panel 400). A first ray L1 of light exiting the first panel 360 via the emitting edge 364 thereof can reflect off of the light reflector and exit the lighting fixture 100 as a first reflected ray R1 of light. More specifically, the first reflected ray R1 of light can pass through the third panel 400. Alternatively or additionally, a second ray of L1 of light exiting the second panel 170 via the emitting edge 174 thereof can reflect off of the light reflector and exit the lighting fixture 100 as a second reflected ray R2 of light. More specifically, the second reflected ray R2 of light can pass through the third panel 400. In this manner, the third panel 400 can be illuminated via the first and second light source 180, 182.

Figure 18:
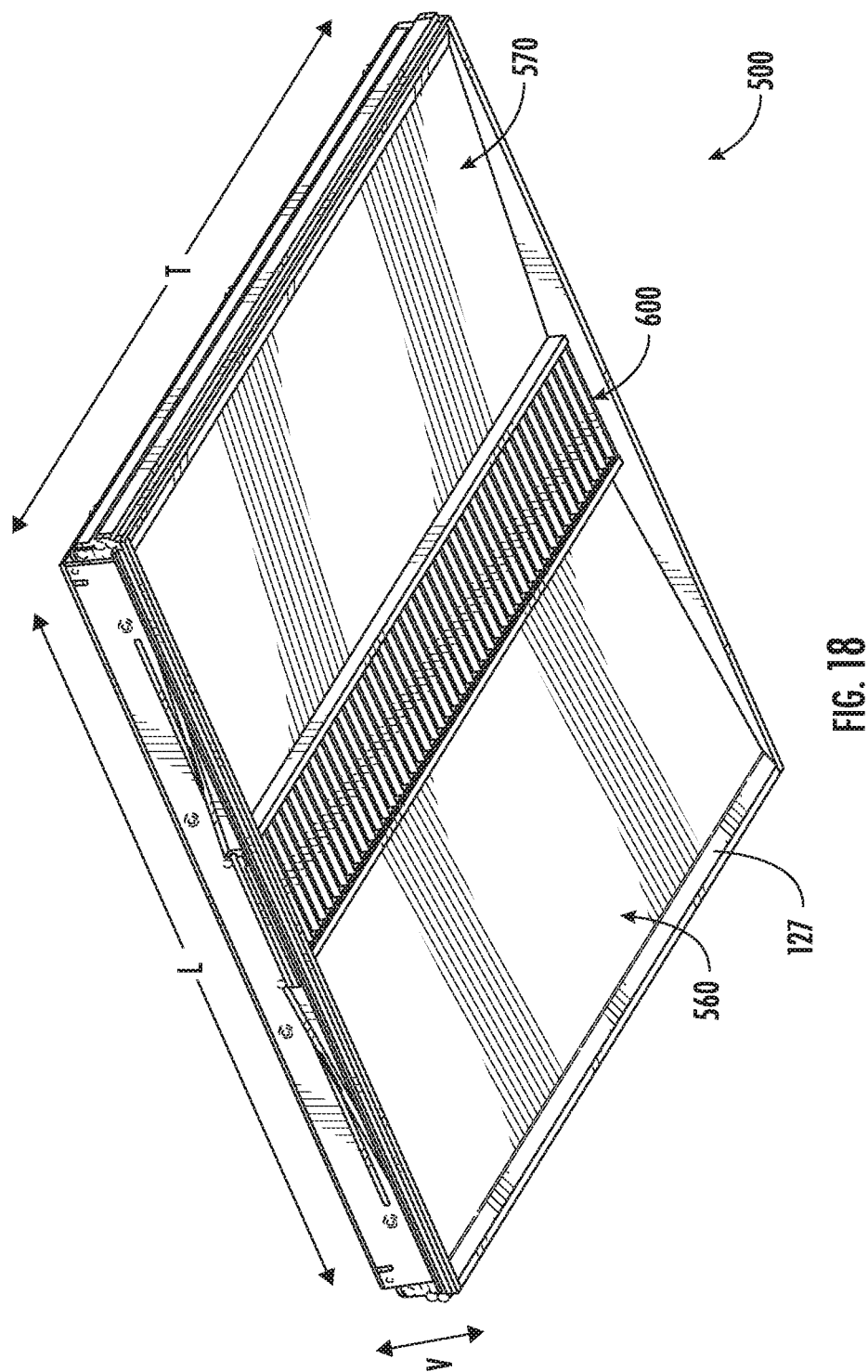
FIG. 18 depicts yet another embodiment of a lighting fixture according to example embodiments of the present disclosure.

Referring now to FIG. 18, yet another embodiment of a lighting fixture 500 is provided according to example embodiments of the present disclosure. The lighting fixture 500 is substantially similar to the lighting fixture 300 discussed above with respect to FIG. 15. Accordingly, the same or similar reference numbers may be used for components that are the same or similar. For instance, the lighting fixture 500 includes a first panel 560 and a second panel 570. However, in contrast to the illuminated surface 400 of the lighting fixture 300 depicted in FIG. 13, the lighting fixture 500 of FIG. 18 includes an illuminated surface 600. As shown, the illuminated surface 600 can be a baffle defining one or more slots. As shown, the baffle is supported, at least in part, between the first rail 550 and the second rail 552 along the lateral direction L.

Figure 19:
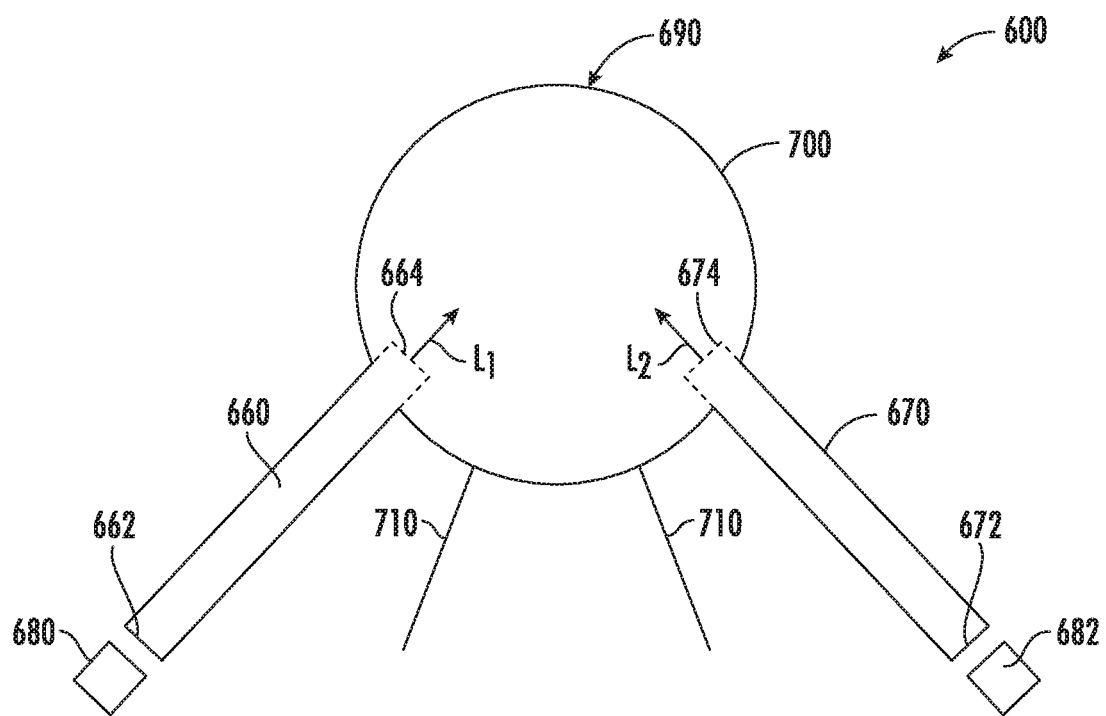
FIG. 19 depicts a cross-sectional view of a lighting fixture according to example embodiments of the present disclosure.

Referring now to FIG. 19, a cross-sectional view of an example lighting fixture 600 is provided according to the present disclosure. The lighting fixture 600 can include a first panel 660. In some implementations, the first panel 660 can include a first light guide having a receiving edge 662 and an emitting edge 664. As shown, a first light source 680 of the lighting fixture 600 can be positioned to illuminate the receiving edge 662 of the first light guide. Furthermore, in some implementations, the first light guide can be etched to transmit light from the receiving edge 662 to the emitting edge 664. In this manner, light emitted from the first light source 680 can enter the first light guide via the receiving edge 662 and exit the first light guide via the emitting edge 664.

As shown, the lighting fixture 600 can further include a second panel 670. In some implementations, the second panel 670 can include a second light guide having a receiving edge 672 and an emitting edge 674. As shown, a second light source 682 of the lighting fixture 600 can be positioned to illuminate the receiving edge 672 of the second light guide. Furthermore, in some implementations, the second light guide can be etched to transmit light from the receiving edge 672 to the emitting edge 674. In this manner, light emitted from the second light source 682 can enter the second light guide via the receiving edge 672 and exit the second light guide via the emitting edge 674.

As shown, the lighting fixture 600 can include an illuminated surface 690. In some implementations, the illuminated surface 690 can be an optic 700 positioned to receive a first ray of light $L_1$ exiting the first light guide and a second ray of light $L_2$ exiting the second light guide. More specifically, the optic 700 can receive the first ray of light $L_1$ via the emitting edge 664 of the first light guide. Conversely, the optic 700 can receive the second ray of light $L_2$ via the emitting edge 674 of the second light guide. As shown, light 710 can exit the lighting fixture 600 via the optic 700. In this manner, the light 710 can illuminate a room or area in which the lighting fixture 600 is located.

In some implementations, the light 710 exiting the optic 700 can be directed towards a floor of the room or area in which the lighting fixture 600 is located. In this manner, the lighting fixture 600 can be used to provide downlighting. It should be understood, however, that the optic 700 can be configured to direct the light 710 in any suitable direction. For instance, in some implementations light exiting the 700 can be directed upward towards the ceiling of the room or area in which the lighting fixture 600 is located. In this manner, the lighting fixture 600 can be used to provide uplighting. It should also be appreciated that the optic 700 can be configured to distribute the light 710 according to any suitable light distribution pattern.

In some implementations, the optic 700 can be a total internal reflection (TIR) lens. It should be appreciated that the TIR lens can have any suitable shape and configuration. For instance, in some implementations the TIR lens can be a linear TIR lens. It should also be appreciated that the lighting fixture 600 can include any suitable number of panels. In this manner, the optic 700 can be configured to receive light from any suitable number of light guides.

Example aspects of the present disclosure are discussed with light fixture 100, 300, 500, 600 for purposes of illustration and discussion. However, those of ordinary skill in the art, using the disclosure provided herein, will understand that other suitable lighting fixture can be used without deviating from the scope of the present disclosure.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A lighting fixture defining a lateral direction, a transverse direction, and a vertical direction, the lighting fixture comprising:
   a frame;
   a first panel supported by the frame, the first panel including a first edge extending between a front surface of the first panel and a rear surface of the first panel;
   a second panel supported by the frame, the second panel including a second edge extending between a front surface of the second panel and a rear surface of the second panel;
   at least one light source configured to illuminate the first panel and the second panel; and
   a light reflector extending adjacent to the rear surface of the first panel and the rear surface of the second panel, the light reflector positioned to reflect light emitted from the first edge and the second edge.

2. The lighting fixture of claim 1, wherein the first edge and the second edge are separated to define an opening in the lateral direction, and at least a portion of the light reflector is positioned above the opening in the vertical direction and extends in the lateral direction between the first edge and the second edge.

3. The lighting fixture of claim 2, wherein the first panel includes a third edge extending between the front surface of the first panel and the rear surface of the first panel, the second panel includes a fourth edge extending between the front surface of the second panel and the rear surface of the second panel, and the at least one light source includes a first set of one or more light emitting diodes (LED) positioned adjacent to the third edge and a second set of one or more LEDs positioned adjacent the fourth edge.

4. The lighting fixture of claim 2, wherein the at least a portion of the light reflector is concave.

5. The lighting fixture of claim 1, wherein at least a portion of the light emitted from the first edge and the the second edge is directed by the reflector to an illuminated surface.

6. The lighting fixture of claim 1, wherein the at least one light source includes one or more fluorescent lights.

7. The lighting fixture of claim 1, wherein the light reflector is spaced apart from the first panel and the second panel along the vertical direction.

8. The lighting fixture of claim 1, wherein the light reflector is configured to limit movement of the first panel relative to the frame along the vertical direction, and wherein the light reflector is configured to limit movement of the second panel relative to the frame along the vertical direction.

9. A lighting fixture defining a lateral direction, a transverse direction, and a vertical direction, the lighting fixture comprising:
   a frame;
   a first light guide supported by the frame, the first light guide including a receiving edge and an emitting edge, the receiving edge and the emitting edge each extending between a front surface of the first light guide and a rear surface of the first light guide;
   a second light guide supported by the frame, the second light guide including a receiving edge and an emitting edge, the receiving edge of the second light guide and the emitting edge of the second light guide each extending between a front surface of the second light guide and a rear surface of the second light guide;
   a first light source positioned adjacent to the receiving edge of the first light guide to illuminate the first light guide;
   a second light source positioned adjacent to the receiving edge of the second light guide to illuminate the second light guide; and
   a light reflector extending adjacent to the rear surface of the first light guide and the rear surface of the second light guide, the light reflector configured to reflect light emitted from the emitting edge of the first light guide and the emitting edge of the second light guide.

10. The lighting fixture of claim 9, further comprising, a first rail extending along the transverse between a first end of the frame and a second end of the frame, and a second rail spaced apart from the first rail along the lateral direction, the second rail extending along the transverse direction between the first end and the second end.

11. The lighting fixture of claim 10, wherein the first rail is angled relative to a plane defined by the rear surface of the first light guide, and the second rail is angled relative to a plane defined by the rear surface of the second light guide.

12. The lighting fixture of claim 10, further comprising a panel supported, at least in part, between the first rail and the second rail.

13. The lighting fixture of claim 10, further comprising a baffle supported, at least in part, between the first rail and the second rail, the baffle defining one or more slots.

14. The lighting fixture of claim 10, wherein the emitting edge of the first light guide is positioned adjacent the first rail, and the emitting edge of the second light guide is positioned adjacent the second rail.

15. The lighting fixture of claim 14, wherein the receiving edge of the first light guide is positioned adjacent a first side of the frame, and the receiving edge of the second light guide is positioned adjacent a second side of the frame.

16. The lighting fixture of claim 15, wherein the first rail is configured to direct light emitted from the receiving edge of the first light guide towards the light reflector, and the second rail is configured to direct light emitted from the receiving edge of the second light guide towards the light reflector.

17. The lighting fixture of claim 9, wherein the at least a portion of the light reflector is concave.

18. The lighting fixture of claim 9, wherein the light reflector is spaced apart from the rear surface of the first panel along the vertical direction, and the light reflector is spaced apart from the rear surface of the second panel along the vertical direction.

19. A lighting fixture defining a lateral direction, a transverse direction, and a vertical direction, the lighting fixture comprising:
- a frame;
- a first light guide supported by the frame, the first light guide including a receiving edge and an emitting edge, the receiving and emitting edges of the first light guide extending between a front surface of the first light guide and a rear surface of the first light guide;
- a second light guide supported by the frame and spaced apart from the first light guide along the lateral direction to define an opening, the second light guide including a receiving edge and a emitting edge, the receiving and emitting edges of the second light guide extending between a front surface of the second light guide and a rear surface of the second light guide;
- a first set of one or more light emitting diodes (LED) positioned adjacent to the receiving edge of the first light guide to illuminate the first light guide;
- a second set of LED(s) positioned adjacent to the receiving edge of the second light guide to illuminate the second light guide; and
- a light reflector extending adjacent to the rear surface of the first light guide and the rear surface of the second light guide, at least a portion of the light reflector positioned above the opening along the vertical direction and extending along the lateral direction between the first light guide and the second light guide to receive light emitted from the first light guide emitting edge and light emitted from the second light guide emitted edge.

20. The lighting fixture of claim 19, wherein at least a portion of the reflector includes a patterned surface.

* * * * *